UNITED STATES PATENT OFFICE.

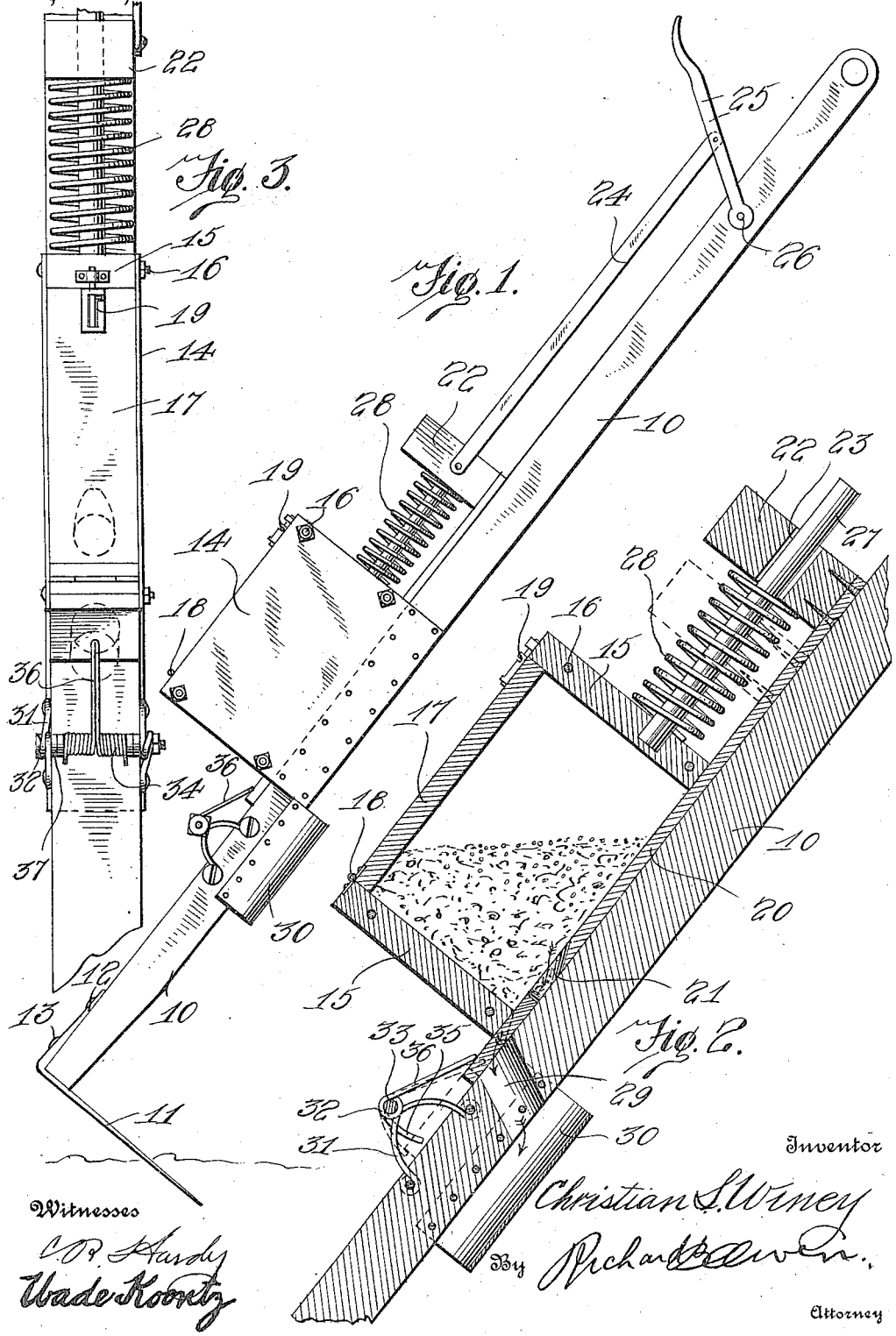

CHRISTIAN S. WINEY, OF McALISTERVILLE, PENNSYLVANIA.

COMBINED HOE AND SEED-PLANTER.

1,184,603.  Specification of Letters Patent.  Patented May 23, 1916.

Application filed November 18, 1914. Serial No. 872,810.

*To all whom it may concern:*

Be it known that I, CHRISTIAN S. WINEY, a citizen of the United States, residing at McAlisterville, in the county of Juniata and State of Pennsylvania, have invented certain new and useful Improvements in Combined Hoes and Seed-Planters, of which the following is a specification.

The object of this invention is to provide an implement combining a hoe and a hand operated corn planter, the device being so arranged that the hoe is capable of performing its usual functions and at the will of the operator seed can be dropped adjacent the hoe blade and thereby the device is converted into a planter.

More specifically, this invention provides a combined hoe and hand operated planter, in which the hoe blade is of the ordinary type while on the hoe handle means is provided whereby seed can be dropped adjacent the cutting edge of the hoe blade and an opening formed by the hoe blade can be used for planting seed dropped by this device.

A still further object of this invention is to provide a hand operated corn planter, the same being preferably mounted on the handle of a hoe on which there is provided an improved means whereby a uniform amount of seed is dropped by each operation of the device, and there is also provided an improved and novel means whereby the likelihood of any seed being stuck or in any other way retained to the feeding means is obviated, the same being removed therefrom and deposited in the desired manner.

A still further object of this invention is to provide a device of the kind above described, that is simple in construction, efficient in operation, consists of the minimum number of parts and therefore can be manufactured for the minimum cost.

With these and other objects in view, this invention consists of certain novel constructions, combinations and arrangement of parts, as will be hereinafter fully described and claimed.

In the accompanying drawings:—Figure 1 is a view in side elevation of the improved device. Fig. 2 is a longitudinal sectional view of the improved seed dropping means. Fig. 3 is a top plan view of the improved seed dropping mechanism.

Referring to the parts by reference numerals, the handle of the implement is designated by the numeral 10, and has at one end thereof a hoe blade 11 having an angular extension 12 that is positioned on one side of the handle 10 and secured thereto by the means 13. A box or seed reservoir is carried by the handle 10 and comprises side plates 14, that are secured by any suitable means to the sides of the handle 10, and end pieces 15 are carried by the side plates 14 by means of the bolts 16; and, as is clearly shown in Fig. 2, these end pieces 15 are in spaced relation to the upper face of the handle 10 for a purpose hereinafter set forth. A cover or top 17 is secured to one of the end members 15 by means of the hinge 18, and a suitable lock 19 is carried adjacent the opposite end of the cover 17 from that to which the hinges are attached. A slide 20 is positioned on the upper face of the handle 10 and is operable between the side plates 14 of the seed box, it of course being obvious that the slide moves under the ends 15 of the seed box, and adjacent one end of the slide is an opening 21. At the opposite extremity of the slide 20 from that of the formation of the opening 21 is a block 22 having a centrally disposed bore 23 formed therein, and pivotally connected to the block 22 is the rod 24 which in turn is pivotally connected to a hand lever 25 that is pivoted at 26 to the handle 10 and forms a means for operating the slide 20. The guiding rod 27 is rigidly carried by one of the end members 15 of the seed box and passes through the centrally disposed bore 23 formed in the block 22, and wound about the same having one of its ends in engagement with the end member of the seed box by which the rod 27 is carried and the other end thereof in engagement with the block 22 is a coil spring 28 that normally urges the block 22 away from the seed box, as is clearly shown in the accompanying drawings.

Formed in the handle 10 adjacent the end 15 of the seed box that carries the hinge 18 is a discharge opening 29, and a discharge spout 30 is secured to the sides of the handle 10 and straddles the lower face thereof so that seeds passing through the opening 29 will be efficiently guided in a direction toward the hoe blade 11.

It is of course obvious that when seed is placed in the seed box, and it is wished to feed the same to the soil that has been opened by the hoe blade 11, all that is necessary is to move the handle lever 25 in a direction toward the seed box that obviously moves the slide 20 in the same direction, and inasmuch as the seed in the seed box will, by gravity, fall into the opening 21 in the slide, the quantity thus fallen will be moved out of the box as the slide moves relative thereto, and when the openings 21 and 29 are alined, the seed held heretofore in the opening 21 will fall by gravity through the opening 29 and into the spout 30 and will be guided thereby to the opening in the soil made by the hoe blade. Inasmuch as heretofore a source of inconvenience has been experienced because of the fact that the seed being sown sticks or is clogged in the feeding means, there is provided with this device, a means whereby the opening 21 in the slide 20 is always cleared of the seed held thereby when the same is in alinement with the opening 29. This means comprises a pair of substantially inverted U-shaped brackets 31 having thereon alined bearings 32 into which a rod or shaft 33 is placed. A strand of wire is wound about said shaft 33 and forms a plurality of convolutions 34 as is clearly shown in Fig. 3, and the ends of the same project in a direction toward the upper face of the handle, the same being designated by the numeral 35. The portion of the wire from which this device is bent, intermediate the convolutions 34, is so arranged as to form an elongated finger 36, that by gravity falls in a position as shown clearly in Figs. 1 and 2, and to space the series of convolutions 34 from the bearings 32 on the substantially inverted U-shaped brackets 31, are a plurality of washers 37. It will thus be seen that the means for clearing the opening 21 are capable of movement on the shaft or rod 33.

As is clearly shown in the accompanying drawings, the slide 20, when in its normal position, extends beyond the end of the seed box adjacent which the brackets 21 are placed and the finger 36 normally rests on this projecting portion of the slide 20 as is clearly shown in Figs. 1 and 2, and when the lever 25 is operated and the slide 20 is moved toward the brackets 31, the end of said slide 20 engages the ends 35 of the wire from which the finger 36 is formed and thus moves the said finger 36 into the opening 21, and as is obvious, clears the opening of any seed that might for any reason whatsoever be retained in the opening. The length of that portion of the slide 20 that extends beyond the opening 21 formed therein toward the brackets 31 is of such length to permit the finger 36 to ride loosely on the said slide 20 and the end of said slide does not engage the ends 35 of the wire until the end of the finger 36 is positioned over the opening formed therein and thus the movement of the slide 20 is in no way hampered.

It is obvious that minor changes may be made in the form and construction of this invention without departing from the material parts thereof. It is therefore not wished to confine the invention to the exact form herein shown and described, but it is wished to include all such as properly come within the scope claimed.

I claim:

1. In a combined hoe and seed dropper, a handle having an opening formed therein, a hoe blade attached thereto, a seed box secured thereto, a slide on said handle and passing through said seed box, said slide provided with an opening formed therein adapted to be placed in alinement with said opening in said handle for feeding seed contained in said seed box therefrom, brackets on said handle adjacent one end of said seed box, a rod carried by said brackets and a single strand of wire bent so as to form a finger, said finger being normally loosely in engagement with the upper face of said slide and also having the ends thereof placed in the path of the end of said slide whereby when the same is moved, the end of said slide will engage said ends of said wire and move said finger into said opening formed in said slide when the same is in alinement with said opening in said handle.

2. In a combined hoe and seed dropper, a handle, a seed reservoir, a hoe blade attached to said handle, a slide passing through said seed reservoir, having an opening formed therein, a means for clearing said opening in said slide of seed when said slide is moved to a certain position, said means comprising a finger adapted for engagement in said opening and abutment prongs adapted for engagement with the end of said slide to positively force said finger into said opening.

In testimony whereof I affix my signature in presence of two witnesses.

CHRISTIAN S. WINEY.

Witnesses:
 JEROME GINGSICH,
 HARRISON B. WINEY.